May 30, 1939.  O. N. RIKOF  2,160,369

TOOL HOLDER

Filed April 2, 1938

Inventor:
Olof Nilsson Rikof

Patented May 30, 1939

2,160,369

UNITED STATES PATENT OFFICE 2,160,369

TOOL HOLDER

Olof Nilsson Rikof, Broxbourne, Herts, England

Application April 2, 1938, Serial No. 199,592
In Great Britain April 12, 1937

6 Claims. (Cl. 29—96)

The present invention relates to improvements in tool holders for metal turning lathes and in particular to the kind of tool holder which comprises a cutter fitted in a cylindrical slot carried obliquely and longitudinally through a steel shank and held in position by a clamp screw which acts on the cutter through the medium of a clamping member, the cutter being supported in the slot by a semi-cylindrical packing piece formed with a groove for the accommodation of the cutter.

In one known form of the above tool holder the cutter is of triangular section and the packing piece is formed with a corresponding V-shaped groove, but it has been found in practice that owing to the weakening of the packing piece by the sharp cornered V-groove, unless the cylindrical surface of the packing piece is carefully fitted to that of the slot the packing piece is liable to split under the action of the clamp screw.

One feature of the present invention is to provide means for preventing such splitting which puts the tool holder out of action and with this object one feature of the invention consists in restricting the groove by forming the lowest bearing surface, i. e., in this case the bottom edge of the V with an eased off portion so that more material will be left between the bottom of the groove and the outer surface of the packing piece. The lower edge of the cutter is eased off in the same manner so that it will fit the groove snugly and be firmly supported in the packing piece.

A further feature of the present invention is to enable a simple tool to be set with different rakes so as to enable the work to be approached at the optimum rake for obtaining maximum efficiency. Generally it is necessary to forge the front end of the tool to a special shape for each particular purpose and to provide a large variety of tools for the various requirements.

In order to overcome this disadvantage according to the invention a tool formed to a suitable shape is embedded in a suitable recess formed in a swivelling support and held under a semi-circular or segmental packing piece by a clamp screw in any desired position for giving the tool the best rake for free and easy cutting.

According to a further feature of the invention the top packing piece may be alternatively of tapered form for giving a definite left-hand or right-hand rake to the tool according to the orientation of the packing piece but for certain internal work such as boring the segmental packing block is preferred as permitting the tool to be set at any angle desired.

The invention is illustrated by way of example in the accompanying drawing in which.

Figure 1:
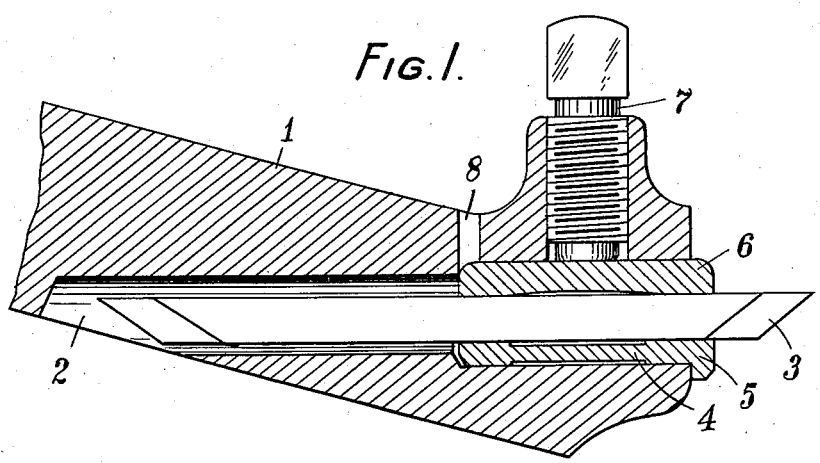
Fig. 1 is a front view of a tool holder.

Referring to Fig. 1 a holder 1 has a cylindrical slot 2 carried obliquely through the head and receiving a cutter 3. The slot 2 is widened in the head of the holder for receiving a swively mounted support or packing piece 4 of semi-circular or nearly semi-circular cross-section and having on its flat side a longitudinal groove of cross-section corresponding to that of the cutter 3 which is accommodated in the groove, the lowermost edge of the cutter being eased off either by flattening (as shown in the drawing in exaggerated form) or by rounding off. The same reference numerals denote like parts in Figs. 1–3.

The cutter is held in position by a clamp screw 7 acting on the cutter through the medium of a semi-circular or segmental packing piece 6 (Figs. 1–2) which is guided in a key way adjoining the upper part of slot 2.

The lower surface of the piece 6 and the inside and outside of the piece 4 are preferably slightly arched so that the pressure is exerted on the ends of the elements and tool chatter is prevented. The packing piece is formed at the front with a shoulder 5 which holds the same in its proper longitudinal position and which lends additional support to the cutter 3. A slot 8 is formed in the shank holder to permit the insertion of a wedge behind the packing piece 6 to facilitate its removal.

Figure 2:
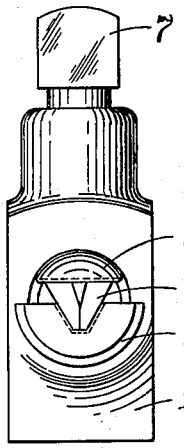
Fig. 2 is a sectional side view of same.
Figure 3:
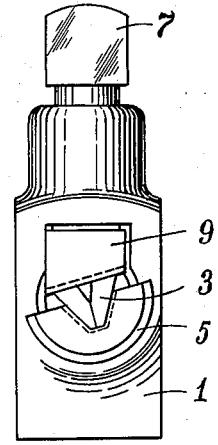
Fig. 3 is a sectional side view of a modified form of tool holder.

In Figs. 2 and 3 the cutter is of triangular section and in this case the lower packing piece 5 being correspondingly formed. Instead of using a semi-circular or segmental top packing piece a clamping bar 9 (Fig. 3) may be used which bar may be tapered so that the tool is given a fixed left-hand or right-hand rake according to the orientation of the bar.

I claim:

1. A tool holder comprising in combination, a shank having an oblique cylindrical longitudinal tool slot, a semi-circular packing piece swively arranged in the front part of said slot and provided with a groove in its plane side to accommodate an angular cutter, the lowermost bearing surface of said cutter having an eased off portion, a clamping member fitted in the shank in a key way adjoining the slot and a clamp screw fitted in the shank so as to bear against said clamping member for holding the elements in position.

2. A tool holder comprising in combination, a shank having an oblique cylindrical longitudinal tool slot, a semi-circular packing piece swivelly arranged in the front part of said slot and provided with a groove in its plane side to accommodate an angular cutter, the lowermost bearing surface of said cutter having an eased off portion, a segmental packing piece fitted in the shank in a key way adjoining the slot and a clamp screw fitted in the shank so as to bear against said segmental piece for holding the elements in position.

3. A tool holder comprising in combination, a shank having an oblique cylindrical longitudinal tool slot, a semi-circular packing piece swivelly arranged in the front part of said slot and provided with a groove in its plane side to accommodate a triangular cutter, the lowermost bearing surface of said cutter having an eased off portion, a segmental packing piece fitted in the shank in a key way adjoining the slot and a clamp screw fitted in the shank so as to bear against said segmental piece for holding the elements in position.

4. A tool holder comprising in combination, a shank having an oblique cylindrical longitudinal tool slot, a semi-circular packing piece swivelly arranged in the front part of said slot and provided with a groove in its plane side to accommodate a cutter of equilateral triangular section, the lowermost bearing surface of said cutter having an eased off portion, a segmental packing piece fitted in the shank in a key way adjoining the slot and a clamp screw fitted in the shank so as to bear against said segmental piece for holding the elements in position.

5. A tool holder comprising in combination, a shank having an oblique cylindrical longitudinal tool slot, a semi-circular packing piece swivelly arranged in the front part of said slot and provided with a groove in its plane side to accommodate an angular cutter, the lowermost bearing surface of said cutter having an eased off portion, a tapered clamp bar fitted in the shank in a key way adjoining the slot, said clamp bar being reversible for inclining the tool in either direction and exchangeable for varying the angle of inclination, and a clamp screw fitted in the shank so as to bear against said clamp bar for holding the elements in position.

6. A tool holder comprising in combination, a shank having an oblique cylindrical longitudinal tool slot, a semi-circular packing piece swivelly arranged in the front part of said slot and provided with a groove in its plane side to accommodate a cutter of equilateral triangular section, the lowermost bearing surface of said cutter having an eased off portion, a tapered clamp bar fitted in the shank in a key way adjoining the slot, said clamp bar being reversible for inclining the tool in either direction and exchangeable for varying the angle of inclination, and a clamp screw fitted in the shank so as to bear against said clamp bar for holding the elements in position.

OLOF NILSSON RIKOF.